(12) United States Patent
Gras et al.

(10) Patent No.: US 10,203,811 B2
(45) Date of Patent: Feb. 12, 2019

(54) NON-CONTACT USER INTERFACE SYSTEM

(71) Applicants: Commissariat à l'énergie atomique et aux énergies alternatives, Paris (FR); ISORG, Grenoble (FR)

(72) Inventors: Antoine Gras, Grenoble (FR); Jérôme Vaillant, Grenoble (FR)

(73) Assignees: Commissariat a l'energie atomique et aux energies, Paris (FR); ISORG, Grenoble (FR)

( * ) Notice: Subject to any disclaimer, the term of this patent is extended or adjusted under 35 U.S.C. 154(b) by 0 days.

(21) Appl. No.: 14/427,551

(22) PCT Filed: Sep. 11, 2013

(86) PCT No.: PCT/FR2013/052090
§ 371 (c)(1),
(2) Date: Mar. 11, 2015

(87) PCT Pub. No.: WO2014/041301
PCT Pub. Date: Mar. 20, 2014

(65) Prior Publication Data
US 2015/0220211 A1 Aug. 6, 2015

(30) Foreign Application Priority Data

Sep. 12, 2012 (FR) ..................... 12 58546

(51) Int. Cl.
*G06F 3/042* (2006.01)
*G06F 3/041* (2006.01)
*G06F 3/045* (2006.01)

(52) U.S. Cl.
CPC .......... *G06F 3/0421* (2013.01); *G06F 3/0412* (2013.01); *G06F 2203/04108* (2013.01)

(58) Field of Classification Search
CPC ........ G02B 2027/0178; G02B 27/0172; G02B 27/017; G06F 3/017
See application file for complete search history.

(56) References Cited

U.S. PATENT DOCUMENTS

| 5,051,570 A | 9/1991 | Tsujikawa et al. |
| 8,354,666 B2 | 1/2013 | Lee et al. |
| 2002/0063813 A1 | 5/2002 | Dirschert et al. |
| 2002/0093027 A1 | 7/2002 | Zhong et al. |

(Continued)

FOREIGN PATENT DOCUMENTS

| EP | 2107446 A1 | 10/2009 |
| JP | H01150192 A | 6/1989 |

(Continued)

OTHER PUBLICATIONS

"Written Opinion of the International Searching Authority" issued in counterpart PCT Application No. PCT/FR2013/052090; dated Mar. 12, 2015.

(Continued)

*Primary Examiner* — Nan-Ying Yang
(74) *Attorney, Agent, or Firm* — Kaplan Breyer Schwarz, LLP

(57) ABSTRACT

A user interface system having rows of photon sensors for detecting an actuating body and lenses, each lens at least partially covering, with the exception of the central portion of the lens, a row of photon sensors.

12 Claims, 4 Drawing Sheets

(56) References Cited

U.S. PATENT DOCUMENTS

| | | | |
|---|---|---|---|
| 2003/0052847 A1 | 3/2003 | Okishiro et al. | |
| 2003/0086030 A1* | 5/2003 | Taniguchi | G02B 6/005 349/61 |
| 2004/0114061 A1 | 6/2004 | Kimura et al. | |
| 2005/0280637 A1 | 12/2005 | Ikeda et al. | |
| 2006/0145365 A1* | 7/2006 | Halls | B82Y 10/00 347/238 |
| 2007/0139386 A1 | 6/2007 | Martin et al. | |
| 2007/0210242 A1 | 9/2007 | Cho | |
| 2007/0287394 A1 | 12/2007 | Swan et al. | |
| 2007/0300182 A1 | 12/2007 | Bilow | |
| 2008/0068484 A1* | 3/2008 | Nam | H04N 5/23293 348/333.01 |
| 2008/0121442 A1 | 5/2008 | Boer et al. | |
| 2008/0122798 A1 | 5/2008 | Koshiyama et al. | |
| 2008/0150848 A1 | 6/2008 | Chung et al. | |
| 2008/0226146 A1 | 9/2008 | Niklan | |
| 2008/0231926 A1* | 9/2008 | Klug | H04N 13/0425 359/23 |
| 2008/0297487 A1 | 12/2008 | Hotelling et al. | |
| 2009/0027371 A1 | 1/2009 | Lin et al. | |
| 2009/0123029 A1 | 5/2009 | Harada et al. | |
| 2009/0128508 A1 | 5/2009 | Sohn et al. | |
| 2009/0177586 A1 | 7/2009 | Niklan | |
| 2009/0237372 A1 | 9/2009 | Kim et al. | |
| 2009/0267919 A1 | 10/2009 | Chao et al. | |
| 2009/0273580 A1 | 11/2009 | Ota et al. | |
| 2009/0315834 A1 | 12/2009 | Nurmi et al. | |
| 2010/0007839 A1 | 1/2010 | Jun et al. | |
| 2010/0013793 A1 | 1/2010 | Abileah et al. | |
| 2010/0027295 A1* | 2/2010 | Lee | G02B 3/0043 362/622 |
| 2010/0067235 A1 | 3/2010 | Yamashita et al. | |
| 2010/0103139 A1 | 4/2010 | Soo et al. | |
| 2010/0283763 A1 | 11/2010 | Kim et al. | |
| 2010/0294936 A1 | 11/2010 | Boberl et al. | |
| 2010/0295797 A1 | 11/2010 | Nicholson et al. | |
| 2010/0295821 A1 | 11/2010 | Chang et al. | |
| 2010/0315413 A1 | 12/2010 | Izadi et al. | |
| 2011/0043473 A1 | 2/2011 | Kozuma | |
| 2011/0043486 A1 | 2/2011 | Hagiwara et al. | |
| 2011/0134055 A1* | 6/2011 | Jung | G06F 3/044 345/173 |
| 2011/0175830 A1 | 7/2011 | Miyazawa et al. | |
| 2011/0222011 A1 | 9/2011 | Murai et al. | |
| 2011/0273390 A1* | 11/2011 | Nakatsuji | G06F 3/0412 345/173 |
| 2011/0291946 A1 | 12/2011 | Mann et al. | |
| 2011/0316679 A1 | 12/2011 | Pihlaja | |
| 2012/0069042 A1 | 3/2012 | Ogita et al. | |
| 2012/0162558 A1 | 6/2012 | Chung et al. | |
| 2012/0182261 A1 | 7/2012 | Wang et al. | |
| 2012/0212465 A1* | 8/2012 | White | G09G 3/2085 345/205 |
| 2013/0007653 A1 | 1/2013 | Stolyarov et al. | |
| 2013/0076695 A1 | 3/2013 | Gomez et al. | |
| 2014/0306097 A1 | 10/2014 | Gomez et al. | |
| 2014/0362051 A1 | 12/2014 | Gomez et al. | |
| 2015/0062461 A1 | 3/2015 | Tallal et al. | |
| 2015/0220211 A1 | 8/2015 | Gras et al. | |
| 2015/0293661 A1 | 10/2015 | Gomez | |

FOREIGN PATENT DOCUMENTS

| | | | |
|---|---|---|---|
| JP | 2007183706 A | | 7/2007 |
| JP | 2009271225 A | | 11/2009 |
| JP | 2010015485 A | | 1/2010 |
| JP | 2010055507 A | * | 3/2010 |
| JP | 2010182046 A | | 8/2010 |
| JP | 2011070658 A | | 4/2011 |
| JP | 2012098959 A | | 5/2012 |
| JP | 2012524306 A | | 10/2012 |
| WO | 2010058629 A1 | | 5/2010 |
| WO | 2010135127 A1 | | 11/2010 |
| WO | 2011119483 A1 | | 9/2011 |
| WO | 2010122865 A1 | | 10/2012 |

OTHER PUBLICATIONS

Aepi et al., "ISORG a presente lors du Forum 41 une tablette interactive, XP002674961", "http://www.isorg.fr/rep-edito/ido-61/isorg_a_prb_sentb_lors_du_forum_4i_une_tablette_interactive.html", Jun. 19, 2011, p. 1 Published in: Internet Citation.

J. Legrand, "International Search Report," dated Nov. 13, 2013, in counterpart PCT International Application No. PCT/FR2013/052090.

Willem Den Boer, et al., "Active Matrix LCD with Integrated Optical Touch Screen", 2003, Publisher: SID 03 Digest.

Officer: J. Thibaudeau, "International Search Report," dated Feb. 4, 2014, issued in PCT International Application No. PCT/FR2013/052450, which is a counterpart of related U.S. Appl. No. 14/435,356.

Officer: J. Thibaudeau "Written Opinion of the International Searching Authority," dated Feb. 4, 2014, issued in PCT International Application No. PCT/FR2013/052450, which is a counterpart of related U.S. Appl. No. 14/435,356.

"Final Office Action", dated Sep. 30, 2015, issued in related U.S. Appl. No. 13/569,379.

"Non-final Office Action", dated Dec. 17, 2015, issued in related U.S. Appl. No. 14/347,986.

"Non-Final Office Action", dated Nov. 17, 2016, issued in related U.S. Appl. No. 14/391,986.

"Non-final Office Action", dated Nov. 5, 2015, issued in related U.S. Appl. No. 14/435,356.

"Notice of Allowance," dated Apr. 13, 2016, issued in related U.S. Appl. No. 14/347,986.

Officer: Llorens V. Charcos "Written Opinion of the International Searching Authority," dated Nov. 26, 2012, issued in PCT International Application No. PCT/FR2012/051863, which is a counterpart of U.S. Appl. No. 14/347,982.

Officer: Llorens V. Charcos "Written Opinion of the International Searching Authority," dated Nov. 26, 2012, issued in PCT International Application No. PCT/FR2012/051864, which is a counterpart of U.S. Appl. No. 14/347,986.

Officer: Jacques Durand "Written Opinion of the International Searching Authority," dated Jul. 12, 2013, issued in PCT International Application No. PCT/FR2013/050777, which is a counterpart of U.S. Appl. No. 14/391,986.

Officer: Jacques Durand "International Search Report," dated Jul. 12, 2013, issued in PCT International Application No. PCT/FR2013/050777, which is a counterpart of U.S. Appl. No. 14/391,986.

Officer: Simin Baharlou, "Written Opinion of the International Searching Authority," dated Jul. 12, 2013, issued in PCT International Application No. PCT/FR2013/050777, which is a counterpart of U.S. Appl. No. 14/391,986.

"Non Final Office Action" dated Oct. 21, 2015, issued in related U.S. Appl. No. 14/347,982.

V. Charcos Llorens, "Search Report," dated Apr. 27, 2012, issued in French Application No. 11/58611, which is a counterpart of related U.S. Appl. No. 13/569,379.

Jean-Yves Laurent et al, "CEA-Liten S2S printing platform for Organic CMOS and Sensors Devices", "Proceedings LOPE-C Conference 2011", Jun. 2011, Publisher: CEA-Liten Institute, Published in: Frankfurt.

"Non Final Office Action", dated Feb. 27, 2014, issued in related U.S. Appl. No. 13/569,379.

Officer: V. Charcos Llorens, "International Search Report", dated Nov. 26, 2012, issued in related PCT International Patent Application No. PCT/FR2012/051864, which is a counterpart of related U.S. Appl. No. 14/347,986.

Hoffner, Linh Nguyen, "Final Office Action," dated Sep. 10, 2014, issued in related U.S. Appl. No. 13/569,379.

"Non-final Office Action," dated Apr. 3, 2015, issued in related U.S. Appl. No. 13/569,379.

Linh Nguyen Hoffner, "Advisory Action," dated Dec. 24, 2014, issued in related U.S. Appl. No. 13/569,379.

(56) References Cited

OTHER PUBLICATIONS

Jamet, Laurent: "The Next Big Wave in the Electronics Industry," OnBoard Technology Sep. 14, 2011—pp. 32-34 (XP002674899).
Pentier, Olivier: "Isorg rend les surfaces intelligentes," Le Dauphine Libere, Sep. 5, 2011 (XP02674900).
CEA-Liten, Isorg: "L'electronique organique imprimee: pour une industrie electronique durable qui repond aux nouveaux besoins de societe," Dossiers Thematiques du Sitelesc, No. Jun. 1, 2011, pp. 12-13 (XP002674907).
Jamet, Laurent: "Organic photodetectors & image sensors, highly innovative products for new markets and attractive business opportunities for printed electronics industry," Printed Electronics and Photovoltaics Europe 2011, Idtechex, UK Apr. 6, 2011, pp. 1-17 (XP008151359).
Coutance, Pascal: "L'avenir apparatient a l'electronique imprimee," Jan. 28, 2012 (XP002674911).
AEPI, "Agence d'Etude et de Promotion de l'Isere: 'ISORG a presente lors du Forum 41 une tablette interactive' (XP002674961)", "AEPI", Jun. 19, 2011, Publisher: URL: http://www.isorg.fr/rep-edito/ido-6l/isorg_a_prb_sentb_lors_du_forum_4i_une_tablette_interactive.htm, Published in: FR.
Christophe Premont, "Photo detectors and sensors designed to be flexible (XP002674972)", "Electronic Engineering Times Europe", Sep. 14, 2011, pp. 17-18, Publisher: URL:http:://www.isorg.fr/edito/files/photodectors_and_sensors_designed_to_be_flexible_798566.pdf, Published in: FR.
Marie Freebody, "New Materials Build Better Organic Photodetectors (XP002674974)", Aug. 9, 2011, pp. 1-3, Publisher: URL:http://www.isorg.fr/edito/files/new_materials_build_befter_organic_photodetectors_174887.pdf, Published in: FR.
Laurent Marchandiau, "Isorg pade sur l'electronique organique imprimee, (XP002674975)", "Interview-Eco; L'essor", Sep. 12, 2011, Publisher: URL:http://www.lessor.fr/2011/09/12/interview-eco-isorg-parie-sur-1%E2%80%99electronique-organique-imprimee/, Published in: FR.
Officer: V. Charcos Llorens, "International Search Report," dated Nov. 26, 2012, issued in related PCT International Patent Application No. PCT/FR2012/051863, which is a counterpart of U.S. Appl. No. 14/347,982.
"Final Office Action", dated Jun. 1, 2016, issued in related U.S. Appl. No. 14/435,356.
"Office Action" issued in co-pending Japanese patent application No. 2015-505003, dated Dec. 20, 2016, Published in: JP.
"Office Action" issued in related U.S. Appl. No. 14/391,986, dated Jun. 27, 2017.
"Office Action" issued in related U.S. Appl. No. 14/738,356, dated Feb. 24, 2017.
"Office Action" issued in related U.S. Appl. No. 14/435,356, dated Sep. 14, 2017.
Authorized Officer: Simin Baharlou, "International Preliminary Report on Patentability" issued in related PCT application No. PCT/FR2013/050777, dated Oct. 14, 2014.
"Japanese Office Action", Japanese Patent Application No. JP2015537328, dated Jun. 14, 2017, 4 pp.
"Notice of Allowance" issued in related U.S. Appl. No. 14/391,986, dated Oct. 5, 2017.
Notice of Allowance received for U.S. Appl. No. 14/435,356, dated Jul. 13, 2018, 8 pages.
"Office Action" issued in related U.S. Appl. No. 14/435,356 dated Mar. 26, 2018.

\* cited by examiner

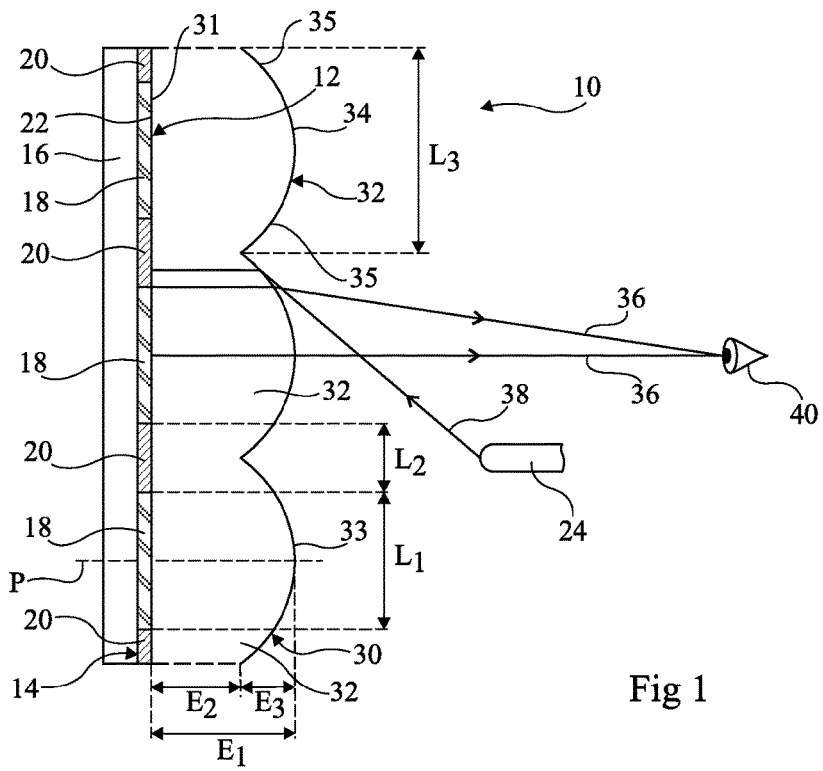
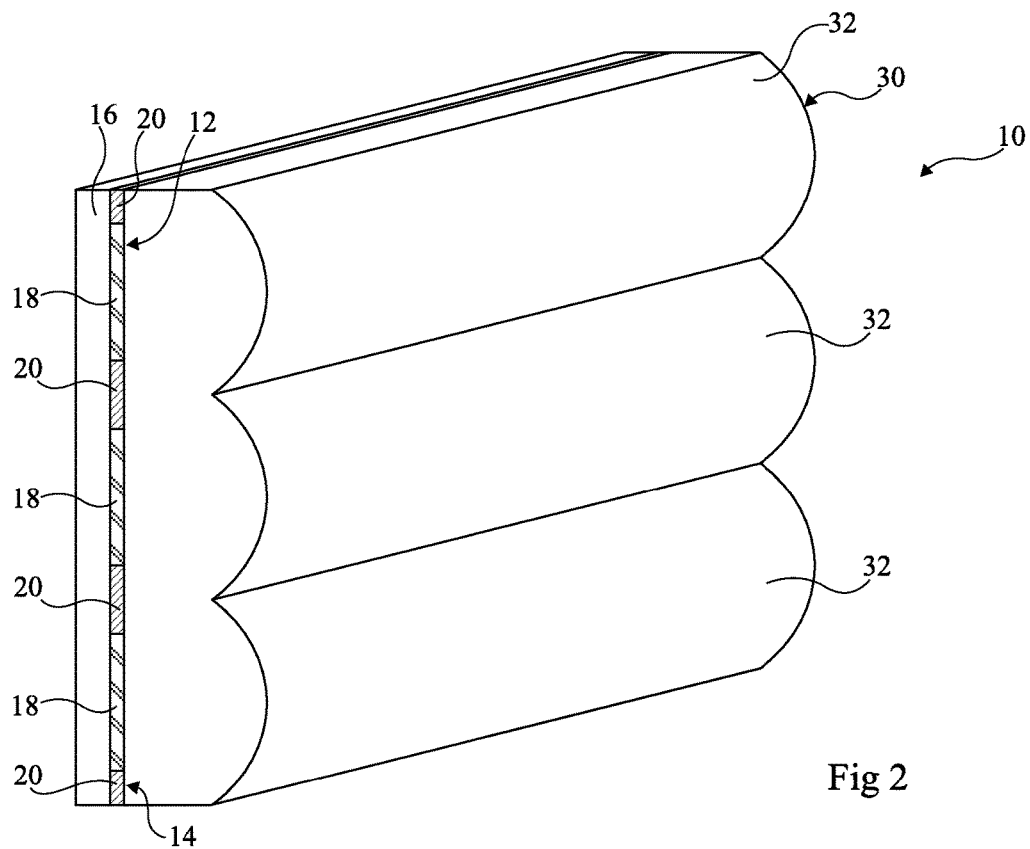
Fig 1
Fig 2

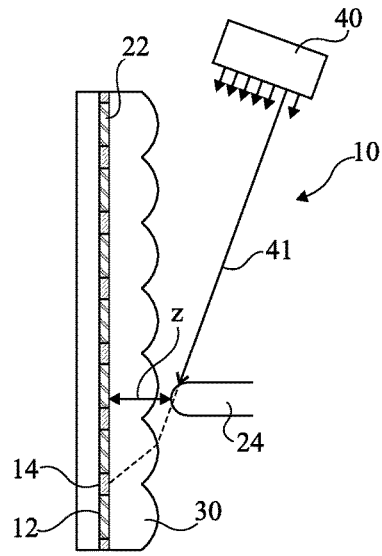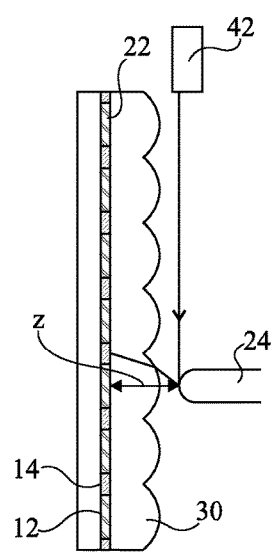
Fig 3            Fig 4
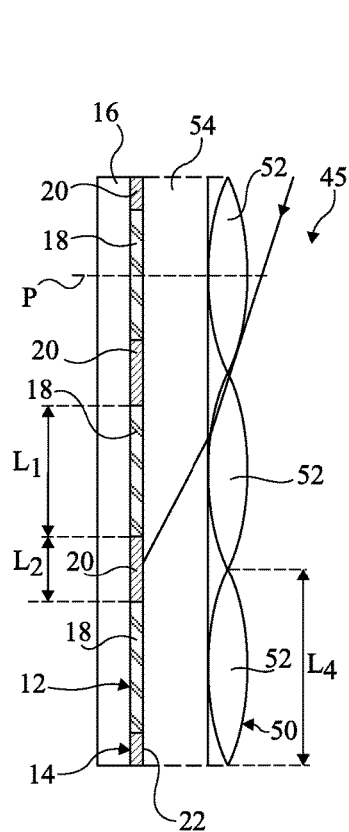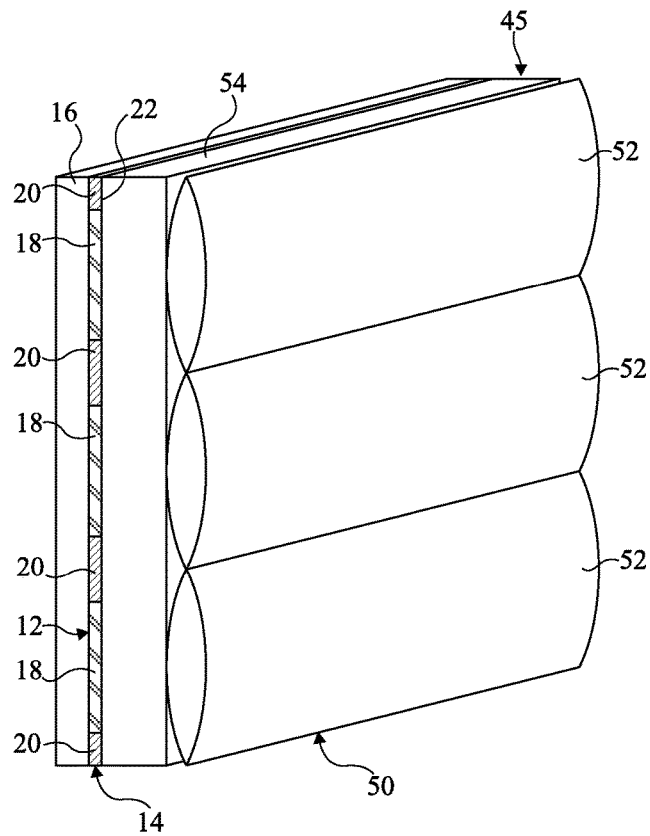
Fig 5            Fig 6

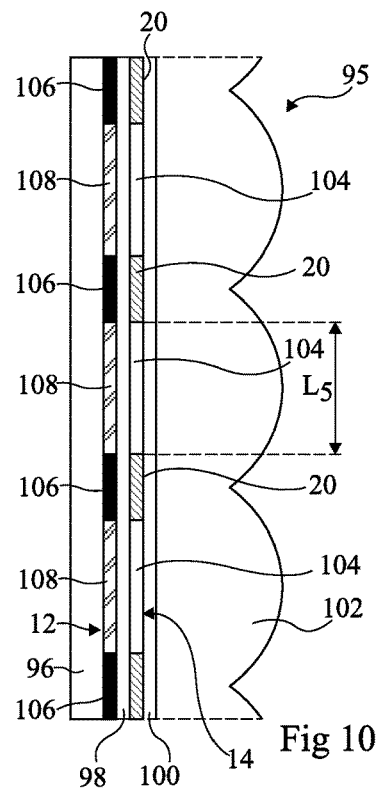
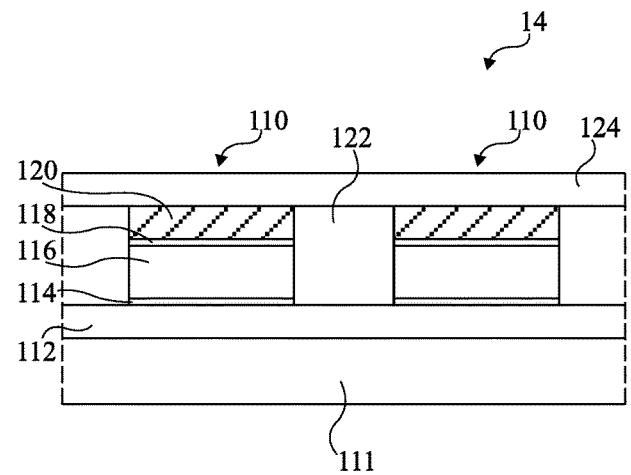
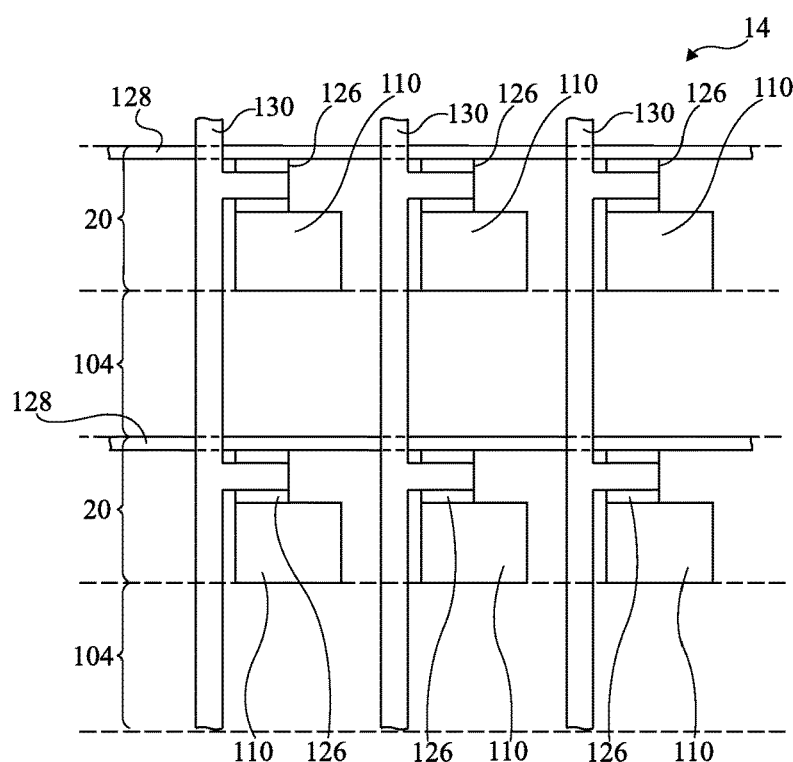

NON-CONTACT USER INTERFACE SYSTEM

BACKGROUND

The present invention relates to a user interface system, or man-machine interface, comprising a display device and a device of contactless detection of an actuation member.

DISCUSSION OF THE RELATED ART

User interface systems controllable by simple sliding of an actuation member on a touch-sensitive surface, or touch surface, which is stacked or integrated to a display screen, which enables to form an interactive user interface, or touch screen, have already been provided. The actuation member for example corresponds to a stylus, a user's finger or hand. Screens comprising a touch-sensitive surface are currently used in many fields. As an example, they have already been used to control cell phones, computers, television sets, motor vehicles, automated ticketing machines, industrial equipment, medical equipment, etc.

A disadvantage of this type of interface is that the touch-sensitive surface tends to rapidly get dirty in contact with the users' fingers. This implies providing a regular cleaning, in particular in case of a use in dirty environments (factories, public transportation, etc.). Touch-sensitive surfaces further raise a hygiene issue, particularly in hospitals where they may be a disease transmission vector. Further, the operation of touch-sensitive surfaces is generally impaired when the user is wearing gloves. This may raise an issue in certain fields of application (industry, surgery, outdoor use in cold weather, ski resort automated ticketing machine, etc.).

French patent application FR11/58607 describes a user interface system comprising a contactless actuation member detection device comprising photodetection cells or photodetectors. In certain embodiments described in this patent application, the interface system comprises a display screen, the photodetection cells covering the display screen or being integrated to the display screen.

A disadvantage of user interface systems where the detection device covers the display device or is integrated to the display device is that the detection device may alter the quality of the display screen. Indeed, in the case where the detection device covers the display screen, it may be difficult to form all the elements forming the detection device with perfectly transparent materials so that the detection surface is not visible by the user. Further, another difficulty is that the display device should not disturb the operation of the detection device. This may particularly be difficult to obtain when the detection device comprises photosensitive sensors. When the detection device is integrated to the display screen, the space occupied by the photodetectors decreases the space available for the pixels and may also alter the quality of the displayed image.

Patent application WO2011/119483 describes an example of a user interface system comprising a display screen and an actuation member detection device which does not cover the display screen. Indeed, the detection device comprises light-emitting diodes and photodetectors arranged on the screen sides to detect the presence of a stylus or of a finger. The advantage of such a user interface is that the quality of the display screen is not altered by the detection device. However, the presence of the light-emitting diodes and of the photodetectors at the periphery of the display screen increases the bulk of the user interface system. In particular, the thickness of the user interface system should be sufficient to house the light-emitting diodes and the photodetectors at the periphery of the display screen. It may be difficult to form a user interface system of low bulk.

SUMMARY

Thus, an object of an embodiment of the present invention is to at least partly overcome the disadvantages of the previously-described user interface systems.

Another object of an embodiment of the present invention is to provide a user interface system comprising a display device and a contactless actuation member detection device which is integrated to the display device or which covers the display device and which does not alter the quality of the displayed image perceived by the user.

Another object of an embodiment of the present invention is to provide a user interface system capable being implemented with any type of display device, particularly a liquid crystal display, a plasma display, a display based on organic semiconductor components, for example, organic light-emitting diodes, or a passive display system, for example, an image printed on a support.

Another object of an embodiment of the present invention is to provide a user interface system capable of being implemented with any type of detection device based on photodetectors, particularly photodetectors formed with inorganic or organic semiconductor materials.

Thus, an embodiment of the present invention provides a user interface system comprising rows of photon sensors for the detection of an actuation member and lenses, each lens covering, except for the central portion of the lens, at least partially a row of photon sensors.

According to an embodiment of the present invention, each lens comprises a non-planar surface comprising said central portion and, for each lens, the surface area of the orthogonal projection of the central portion on a plane containing the rows is greater than or equal to 50% of the surface area of the orthogonal projection of the non-planar surface on said plane.

According to an embodiment of the present invention, the user interface system comprises a display device comprising rows of pixels and an actuation member detection device comprising the rows of photons sensors, the lenses covering the pixels and the photon sensors, the central portion of each lens covering at least one pixel and covering no photon sensor.

According to an embodiment of the present invention, each lens comprises a peripheral portion surrounding the central portion, at least a portion of the peripheral portion covering at least a portion of a row of photon sensors.

According to an embodiment of the present invention, the detection device covers the display device or is integrated to the display device.

According to an embodiment of the present invention, the pixel rows are parallel to the rows of photon sensors.

According to an embodiment of the present invention, each lens covers the entire width of a single row of pixels.

According to an embodiment of the present invention, each lens is a cylindrical lens extending parallel to the rows of photon sensors.

According to an embodiment of the present invention, the detection device is integrated to the display device and each row of pixels is interposed between two rows of photon sensors, except, possibly, for pixel rows extending along the edges of the display device.

According to an embodiment of the present invention, the detection device covers the display device and the rows of photon sensors are separated by transparent strips, each transparent strip covering at least one pixel row.

According to an embodiment of the present invention, the display device is a display screen, the pixels covered by the rows of photon sensors remaining black in operation.

According to an embodiment of the present invention, the lenses are contiguous.

According to an embodiment of the present invention, the lenses are separated from one another by an air gap or by an opaque material.

According to an embodiment of the present invention, the detection device is capable of detecting variations of the shadow and/or of the image of the actuation member and of deducing therefrom information representative of a position variation of the actuation member.

According to an embodiment of the present invention, the system comprises infrared emitters.

According to an embodiment of the present invention, the photon sensors are organic sensors formed by deposition of organic conductive and semiconductor materials in liquid form on a dielectric support.

According to an embodiment of the present invention, the display device comprises a display screen or an image attached to a support.

BRIEF DESCRIPTION OF THE DRAWINGS

The foregoing and other features and advantages will be discussed in detail in the following non-limiting description of specific embodiments in connection with the accompanying drawings, among which:

FIGS. 1 and 2 respectively are a cross-section view and a perspective view, partial and simplified, of an embodiment of a user interface system according to the invention;

FIGS. 3 and 4 illustrate two examples of operation of the user interface system of FIGS. 1 and 2;

FIGS. 5 and 6 respectively are a cross-section view and a perspective view, partial and simplified, of another embodiment of a user interface system according to the invention;

FIGS. 8 to 10 are partial simplified cross-section views of others embodiments of a user interface system according to the invention;

FIG. 11 is a partial simplified cross-section view illustrating an embodiment of photodetectors according to the invention; and FIG. 12 is a partial simplified front view of an example of detection device of a user interface system according to the invention.

DETAILED DESCRIPTION

Figure 7:
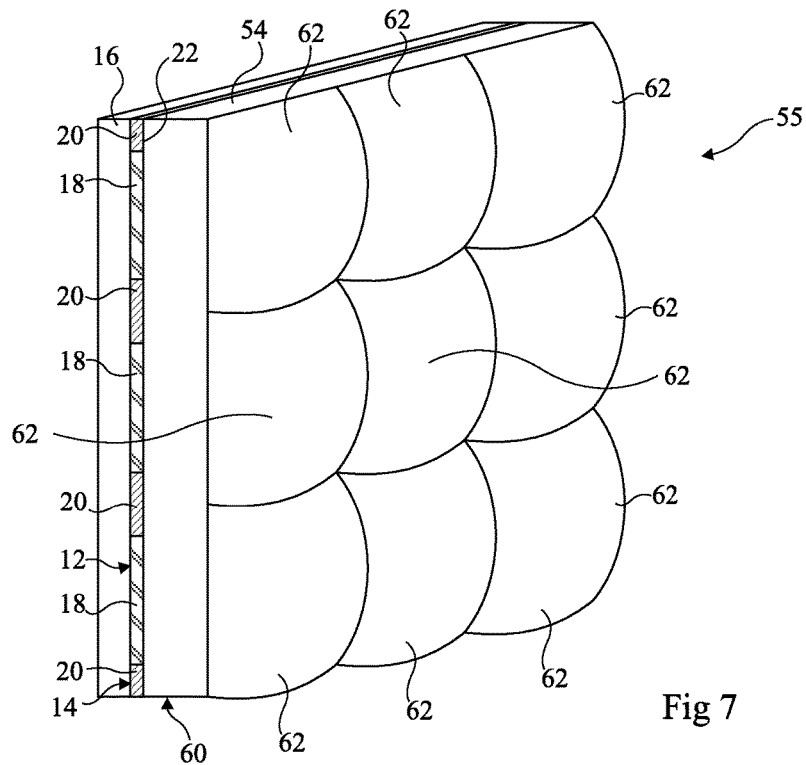
FIG. 7 is a partial simplified perspective view of another embodiment of a user interface system according to the invention.

For clarity, the same elements have been designated with the same reference numerals in the various drawings and, further, the various drawings are not to scale. Further, only those elements which are useful to the understanding of the present invention have been shown and will be described. In particular, what use is made of the user interface systems described hereafter has not been detailed. It will be within the abilities of those skilled in the art to use the provided systems in any type of device capable of being controlled via a touch-sensitive and/or contactless interface. Further, the means for processing the information provided by the user interface systems described hereafter and the means of connection with the device(s) to be controlled are within the abilities of those skilled in the art and will not be described. In the following description, unless otherwise indicated, terms "substantially", "approximately", and "in the order of" mean "to within 10%".

FIGS. 1 and 2 show an embodiment of a user interface system 10 according to the invention comprising a display device 12 and a detection device 14 formed on the same support 16.

Display device 12 may be a display screen. The means for controlling display screen 12 and the means for processing the signals supplied by detection device 14 are not shown. Display screen 12 may corresponding to a liquid crystal display, to a display based on organic semiconductor components, for example, organic light-emitting diodes, etc. Detection device 14 comprises photon sensors or photodetectors. The technology for forming detection device 14 may depend on the technology used to form display screen 12. As an example, when display screen 12 corresponds to a liquid crystal display, detection device 14 may comprise photodetectors such as those described in patent application US2010/0013793. When display screen 12 comprises organic light-emitting diodes, detection device 14 may comprise photodetectors formed based on organic semiconductor materials such as those described in patent application FR11/58607.

Display screen 12 comprises rows 18 of pixels and detection device 14 comprises rows 20 of photodetectors. FIGS. 1 and 2 show three rows 18 of pixels and four rows 20 of photodetectors. As an example, width $L_1$ of each row 18 of pixels may be in the order of 200 micrometers and width $L_2$ of each row 20 of photodetectors may be in the order of 50 micrometers. A row 18 of pixels alternates with a row 20 of photodetectors so that, except for the rows located at the ends of user interface system 10, each row 18 of pixels is interposed between two photodetector rows 20 and each row 20 of photodetectors is interposed between two pixel rows 18. On the side opposite to support 16, display screen 12 and detection device 14 form a planar surface 22. As a variation, surface 22 may be non-planar.

Detection device 14 may be capable of detecting variations of the shadow of an actuation member 24 and/or of the light reflected by actuation member 24 and of deducing therefrom information representative of a position variation of actuation member 24. Actuation member 24 may be one of the user's fingers, his/her hand, or any other object, for example, a stylus. It should be noted that "position of actuating member 24" here means a relative position relative to user interface system 10. An embodiment where the user interface system itself is displaced may be provided, the actuation member remaining fixed.

User interface system 10 comprises a lenticular screen 30 covering surface 22. Lenticular screen 30 may be bonded to surface 22. Lenticular screen 30 comprises a planar surface 31 supported by surface 22. As a variation, when surface 22 is not planar, surface 31 follows the shape of surface 22. Lenticular screen 30 for example comprises adjacent cylindrical lenses 32 which extend parallel to rows 18 and 20. These may be plano-convex cylindrical lenses. Each lens 32 comprises a non-planar surface 33 capable of making the light rays converge or diverge. As an example, three lenses 32 are shown in FIGS. 1 and 2.

Lenticular screen 30 may be made of an optical-grade organic or inorganic material (and possibly by combining a plurality of optical elements made of different materials). An optical-grade material is for example a material which is transparent in the wavelength range of interest and enabling to form parts having a good surface condition.

For organic materials, polycarbonates such as the material commercialized by Westlake under name Zelux or the material commercialized by Röchling under name Sustanat, acrylics such as PMMA (Polymethyl-Methacrylate) or cyclo-olefin polymers (COP) such as the material commercialized by Zeon Chemicals under name Zeonex, may be mentioned.

For inorganic materials, conventional optical glasses may be mentioned, and in particular:

"crown"-type glass, for example, borosilicate glass such as the glass commercialized by Schott under name BK7; or "flint"-type glass, for example, the glass commercialized by Schott under name BaF4.

Width $L_3$ of each lens 32 is substantially equal to the sum of widths $L_1$ and $L_2$. Lenticular screen 30 has a maximum thickness $E_1$ and a minimum thickness $E_2$. Each lens 32 has a thickness $E_3$. The focal distance of each lens 32 is adjusted so that photosensitive area 20 is approximately at the secondary focus of lens 32.

Lenticular screen 30 is placed relative to rows 18 and 20 so that a lens 32 covers a row 18 of pixels across the entire width $L_1$ and at least a portion of width $L_2$ of at least a row 20 of photodetectors. In the embodiment shown in FIGS. 1 and 2, each lens 32 covers a row 18 of pixels across the entire width $L_1$, half of width $L_2$ of photodetector row 20 located on one side of row 18 of pixels and half of width $L_2$ of photodetector row 20 located on the other side of pixel row 18. Each lens 32 may comprise a plane of symmetry P. Lenticular screen 30 may then be placed relative to rows 18 and 20 so that plane P of each lens 32 is substantially located in the middle of a pixel row 18.

As an example, lenticular screen 30 may comprise planoconvex lenses 32 made of glass commercialized under name BK7, arranged as shown in FIGS. 1 and 2, for which width $L_3$ is 250 μm, thickness $E_1$ is 150 μm, the radius of curvature of each lens 32 is 200 μm, and thickness $E_3$ is 45 μm.

Generally, non-planar surface 33 of each lens 32 comprises a central portion 34 and peripheral portions 35. Peripheral portions 35 deviate light rays more strongly than central portion 34. Central portion 34 only covers pixel row 18 while at least one peripheral portion 35 at least partially covers a photodetector row 20.

As an example, the width of the orthogonal projection of non-planar surface 33 on surface 22 is substantially equal to $L_3$, the width of the orthogonal projection of central portion 34 on surface 22 is smaller than or equal to $L_1$, and the sum of the widths of the orthogonal projections of peripheral portions 35 on surface 22 is greater than or equal to $L_2$. Preferably, the surface of the orthogonal projection of central portion 34 on surface 22 is greater than or equal to 50% of the surface area of the orthogonal projection of non-planar surface 33 on surface 22.

Each lens 32 deviates the light rays emitted by row 18 or collected by row 20 (which forms a dark area). The light rays originating from a pixel row 18 and substantially perpendicular to surface 22 are only slightly deviated and their directions remain relatively close to the optical axis while the light rays reflected by a photodetector row 20 and substantially perpendicular to surface 22 are deviated in a direction strongly deviating from the optical axis. As an example, paths 36 of the two light rays emitted by pixels of a pixel row 18 and path 38 of a light ray which has been reflected or which reaches a photodetector of a photodetector row 20 are shown in FIG. 1. Thereby, a user 40 only perceives light rays originating from pixel rows 18 and does not perceive the dark area of photodetector rows 20. User 40 thus only sees the image diffused by display screen 12 and does not see detection device 14.

"Inclination of a light ray" means the angle between the light ray and the normal to surface 22. A light ray perpendicular to surface 22 has a 0° inclination. Light rays having a significant inclination relative to surface 22 tend to be deviated by lenses 32 and to be received by the photodetectors of detection device 14. The detection of actuation member 24 which is close to lenticular screen 30 may be based on the detection of the presence or of the absence of such grazing light rays. The operation of detection device 14 is thus not disturbed by the presence of lenticular screen 30.

The focal surface of each lens 32 may be non-planar. In this case, each row 20 of photodetectors is preferably arranged at the level of the focal surface of lens 32, while pixel row 18 may be shifted with respect to the focal surface of the associated lens 32. However, the fact for pixel row 18 not to be located at the level of the focal surface of the associated lens 32 does not disturb the operation of display device 12, since a lens 32 only covers one pixel row and each pixel emits a uniform light ray.

Detection device 14 may be capable of detecting displacements of actuation member 24 in a plane parallel to surface 22, and variations of the distance between actuation member 24 and surface 22.

FIG. 3 illustrates an operating principle of user interface system 10 according to which detection device 14 is capable of detecting variations of the shadow of actuation member on system 10 and of deducing therefrom information representative of a position variation of actuation member 24. Actuation member 24 should be interposed between system 10 and a light source. The light source is preferably ambient light, for example, the sun or the indoor electric lighting of a room in a building. However, due to the light produced by display screen 12, it may be necessary to provide a specific light source 40 which emits light having a low inclination relative to surface 22. Light source 40 is preferably provided at the periphery of detection device 14 to avoid getting in the way of display screen 12. FIG. 3 shows the travel of a light ray 41 interrupted by actuation member 24, the remaining portion of the travel of light ray 41 in the absence of actuation member 24 being indicated in dotted lines.

As an example, in an initialization phase, detection device 14 measures the ambient brightness, that is, the light intensity received by each photodetector of detection device 14 when no actuation member 24 is arranged opposite detection device 14.

When actuation member 24 is placed between the light source and detection device 14, the cast shadow of actuation member 24 on detection device 14 causes a decrease in the light intensity received by certain photodetectors. This enables detection device 14 to detect the presence of actuation member 24 close to detection device 14 and, if necessary, to follow the displacements of actuation member 24 in a plane parallel to surface 22.

When distance Z between actuation member 24 and detection device 14 varies, the light intensity level received by the photodetectors also varies. In particular, when actuation member 24 is brought closer to detection device 14, the light intensity received by the photodetectors in the shadow of actuation member 24 decreases, and when actuation member 24 is drawn away from the detection device, the light intensity increases. Detection device 14 is capable of deducing, from the variations of the cast shadow of actuation member 24, information relative to the variations of the distance between actuation member 24 and detection device 14. In an alternative embodiment, a calibration phase enabling to create a correspondence between the intensity level of the cast shadow of actuation member 24 and the distance between actuation member 24 and detection device 14 may be provided. This enables detection device 14 to measure the distance between actuation member 24 and detection device 14.

FIG. 4 illustrates another operating principle of user interface system 10 according to which detection device 14 is capable of detecting variations of the image of actuation member 24 on system 10 and of deducing therefrom information representative of a position variation of actuation member 24. System 10 further comprises one or a plurality of sources 42 of light, for example, infrared, which reflects on actuation member 24. The reflected light rays are detected by the photodetectors located close to actuation member 24. Light sources 42 may correspond to infrared emitters located at the periphery of detection device 14. As a variation, these may be infrared emitters integrated to detection device 14 or to display screen 12. Thus, the infrared emitters, in combination with the photodetectors of detection device 14, enable system 10 to implement the same functions of detection of the position variations of actuation member 24 as the photodetectors alone used as shading detectors.

Thus, in a preferred embodiment, detection device 14 is capable of detecting the position in three dimensions of actuation member 24 in the space located opposite detection device 14.

FIGS. 5 and 6 show another embodiment of a user interface system 45 according to the invention where lenticular screen 50 is made of a network of biconvex cylindrical lenses 52. As an example, three biconvex cylindrical lenses 52 are shown.

Lenticular screen 50 may be separated from surface 22 by a transparent plate 54 interposed between surface 22 and lenticular screen 50. As a variation, lenticular screen 50 may be directly laid on surface 22. Just like for lenticular screen 30 previously described in relation with FIGS. 1 and 2, width $L_4$ of each biconvex cylindrical lens 52 may be equal to the sum of widths $L_1$ and $L_2$. Further, lenticular screen 50 is arranged relative to surface 22 similarly to what has been previously described for lenticular screen 30. Lenticular screen 50 is placed relative to rows 18 and 20 so that a lens 52 covers a pixel row 18 across the entire width $L_1$ and at least a portion of width $L_2$ of at least one photodetector row 20. In the embodiment shown in FIGS. 5 and 6, each lens 52 covers a pixel row 18 across the entire width $L_1$, half of width $L_2$ of photodetector row 20 located on one side of pixel row 18 and half of width $L_2$ of photodetector row 20 located on the other side of pixel row 18. Each lens 52 may comprise a plane of symmetry P. Lenticular screen 50 is then placed relative to rows 18 and 20 so that plane P of each lens 52 is substantially located in the middle of a pixel row 18.

The use of biconvex lenses 52 rather than plano-convex lenses 32 advantageously enables to decrease the curvature of the focal surface and to increase the radius of curvature of lenses 52 approximately by a factor 2. Geometric aberrations outside of the optical axis are thus decreased. Further, the shielding effect, which corresponds to the blocking of light rays which should theoretically reach a lens by the presence of an adjacent lens, is decreased.

FIG. 7 shows another embodiment of a user interface system 55 according to the invention where lenticular screen 60 is formed of a network of converging lenses 62 having a circular, square, or rectangular base. As an example, FIG. 7 shows nine converging plano-convex-type lenses 62 with a square base. Each lens 62 totally covers a pixel of a pixel row 18 and at least partly covers a photodetector of a photodetector row 20. Advantageously, each pixel comprises an axis of symmetry. The optical axis of each lens 62 is then preferably substantially confounded with the axis of symmetry of the pixel that it covers. As a variation, each lens 62 may be a biconvex converging or converging meniscus lens or the combination of a plurality of lenses such as conventionally used in optics (for example, by using doublets or triplets to decrease chromatic aberrations).

In the previously-described embodiments, each photodetector of a row 20 is capable of receiving grazing light rays independently from their orientation. As an example, in FIG. 1, each photodetector of a row 20 may receive grazing light rays originating from the top or the bottom of the drawing. However, for certain applications, it may be desirable for a photodetector to only detect grazing light rays originating from a privileged direction.

Figure 8:
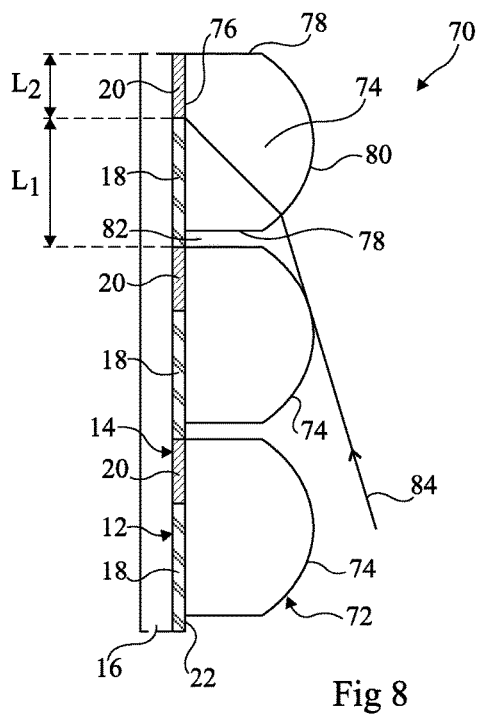

FIG. 8 shows an embodiment of a user interface system 70 where the light ray detection is privileged along a specific direction. In this embodiment, lenticular screen 72 comprises cylindrical lenses 74 separated from one another. Each cylindrical lens 74 extends parallel to rows 18, 20. Each lens 74 comprises a base 76 in contact with surface 22, two parallel lateral sides 78, and a bulged surface 80. Lateral side 78 of a lens 74 is separated from lateral side 78 of an adjacent lens 74 by a gap 82. Gap 82 may be filled with air. Lateral sides 78 of each lens 74 may further be covered with a reflective material, for example, a metallic material. As a variation, gap 82 may be totally filled with an opaque material.

Each cylindrical lens 74 covers a pixel row 18 substantially across its entire width $L_1$ and a row 20 of photodetectors substantially across its entire width $L_2$, rows 18 and 20 being contiguous. Path 84 of a light ray is shown in FIG. 8. Only grazing light rays originating from the bottom in FIG. 8 may be detected by the photodetectors.

Figure 9:
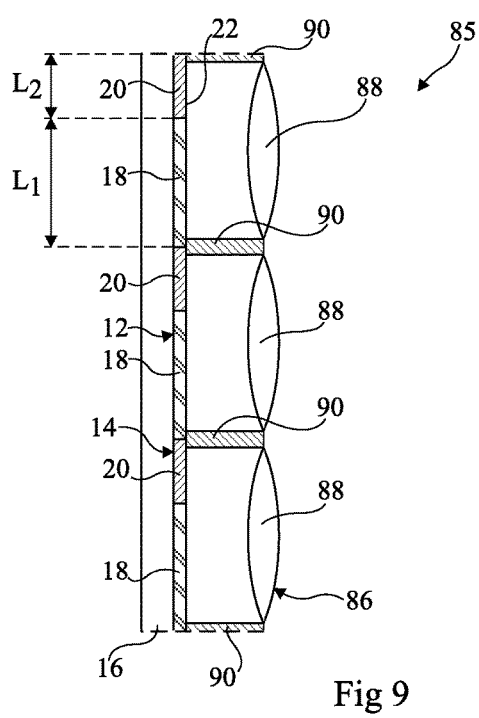

FIG. 9 shows an embodiment of a user interface system 85 where the light ray detection is privileged along a specific direction. In this embodiment, lenticular screen 86 comprises cylindrical lenses 88 separated from one another. Cylindrical lenses 88 extend parallel to rows 18, 20. Preferably, lenses 88 are biconvex lenses. Each lens 88 is maintained by two supports 90 of an opaque material interposed between lenticular screen 86 and surface 22. A support 90 may be in contact with two lenses 88. Supports 90 may have the shape of walls extending parallel to the direction of rows 18 and 20. Supports 90 may be attached to surface 22 substantially at the border between a pixel row 18 and a photodetector row 20 so that a single row 18 of pixels and a single row 20 of photodetectors are located between two successive supports 90.

FIG. 10 shows another embodiment of a user interface system 95 according to the invention where detection device 14 covers display device 12. User interface system 95 comprises a support 96 having display device 12 formed thereon. Display device 12 may correspond to an image formed on support 96, for example, by any printing technique. As an example, the image is formed on a paper or plastic poster, on cardboard, on fabric, etc. Display device 12 may correspond to a display screen. Display device 12 may comprise a pixel array covering support 96. Display device 14 is for example an organic light-emitting diode display. The forming of organic light-emitting diodes by printing techniques is for example described in article "CEA-LITEN S2S printing platform for Organic CMOS and Sensors Devices".

Detection device 14 is sandwiched between two transparent protection layers 98 and 100 and covers display device 12. A lenticular screen 102 covers detection device 14. In FIG. 10, lenticular screen 102 has the same structure as lenticular screen 30 shown in FIG. 1. As a variation, lenticular screen 102 may have the same structure as previously-described lenticular screens 50, 60, 72, 86.

Detection device 14 comprises photodetector rows 20 separated by transparent strips 104 so that, for each pair of successive photodetector rows 20, a transparent strip 104 is interposed between the two rows 20.

Display device 12 may correspond to a known display screen where the pixel rows are substantially contiguous. Photodetector rows 20 are then oriented parallel to the pixel rows of display screen 12. Further, preferably, display screen 12 is controlled so that the pixel row or the pixel rows which are not covered with a photodetector row 20 emit no light, the pixels being left black. Preferably, width $L_5$ of each transparent strip 104 may be substantially equal to the width of a pixel row in matrix display 12. In this case, each transparent strip 104 covers a single pixel row of the matrix display. As a variation, width $L_5$ of each transparent strip 104 may be strictly greater than the width of a pixel row of matrix display 12. In this case, each transparent strip 104 covers more than one pixel row of matrix display 12. In FIG. 10, display device 12 is represented by black strips 106 and hatched strips 108, each black strip 106 corresponding to a portion of display device 12 covered with a photodetector row 20 and each hatched strip 108 corresponding to a portion of display device 12 covered with a transparent strip 104. Each strip 106 and 108 may correspond to a pixel row or to more than one pixel row.

FIG. 11 is a partial simplified cross-section view of an embodiment of the photodetectors of detection device 14, particularly adapted to the case where detection device 14 is fixed to display device 12. FIG. 11 shows two photodetectors 110. Photodetectors 110 are formed on a surface of a transparent or translucent dielectric substrate or support 111, for example, made of glass or plastic, for example, previously-described protection layer 98.

Each photodetector 110 comprises a stack comprising, in the following order starting from substrate 111:
- a transparent electrode 112, for example, made of transparent conductive oxide or TCO, for example, made of indium tin oxide or ITO;
- an electron injection portion 114, for example, made of heavily-doped transparent organic semiconductor polymer or of a transparent conductive metal oxide, for example, of ZnO type;
- a portion 116 made of a mixture of organic semiconductor polymers, for example poly(3-hexylthiophene) or poly (3-hexylthiophene-2,5-diyl) (P-type semiconductor), known as P3HT, mixed with [6,6]-phenyl-$C_{61}$-butyric acid methyl ester (N-type semiconductor), known as PCBM;
- a portion 118 of heavily-doped organic semiconductor polymer (for example, a polymer known as PEDOT: PSS, which is a mixture of poly(3,4)-ethylenedioxythiophene and of sodium polystyrene sulfonate; and
- an electrode 120, for example, made of aluminum or silver.

Laterally, semiconductor regions 116 of photodetectors 110 are separated from one another by a dielectric material 122. Further, a transparent protective coating 124 covers the upper surface of the array (on the side of electrodes 118). It for example is previously-described protection layer 100.

In this example, photodetectors 110 are intended to be illuminated through transparent substrate 98 (and through transparent layers 112 and 114).

Transparent electrodes 112 may have, in top view, the shape of parallel strips. In this case, opaque electrodes 118 may correspond to parallel strips, each strip 118 being connected to all the photodetectors of a same row 20 of detection device 12 and transparent strips 112 extend perpendicular to rows 20 and are connected to photodetectors of different rows 20. As a variation, electrodes 112 may belong to a plate of the transparent conductive material in contact with all photodetectors 110.

Photodetectors 110 of detection device 14 may be formed by printing techniques. The materials of previously-described layers 114 to 124 are deposited in liquid form, for example, in the form of conductive and semiconductor inks by means of inkjet printers. "Materials in liquid form" here also include gel materials capable of being deposited by printing techniques. Anneal steps may be provided between the depositions of the different layers, but the anneal temperatures may not exceed 150° C., and the deposition and the possible anneals may be performed at the atmospheric pressure.

The forming of organic semiconductor components by printing techniques is for example described in article "CEA-LITEN S2S printing platform for Organic CMOS and Sensors Devices" by Jean-Yves Laurent et al., LOPE-C Conference, June 2011, Frankfurt.

FIG. 12 is a simplified top view of detection device describing in further detail the means for addressing photodetectors 110. FIG. 12 partially and schematically shows two rows 20, each comprising three photodetectors 110. A selection element 126 is associated with each photodetector 110. Selection element 126 may correspond to an organic thin film transistor (OTFT). One of the terminals among the source and the drain of transistor 126 is connected to electrode 120 of photodetector 110 and the other terminal among the source and the drain is connected to a conductive track 128. Conductive track 128 may be connected to all the selection elements 126 of a row 20. Track 128 may be made of an opaque material, for example, of metal. The gate of each transistor 126 may be controlled by a signal transmitted by a track 130 of a transparent conductive material extending along a direction perpendicular to rows 20. Track 130 may be connected to transistors 126 of different rows 20.

Specific embodiments of the present invention have been described. Various alterations, modifications, and improvements will occur to those skilled in the art. In particular, examples of lenticular screens with plano-convex cylindrical lenses, biconvex cylindrical lenses, and converging lenses have been described. It should however be clear that the present invention may be implemented with lenticular screens comprising plano-concave cylindrical lenses, biconcave cylindrical lenses, or diverging lenses or any combinations of these lenses.

Various embodiments with different variations have been described hereabove. It should be noted that those skilled in the art may combine various elements of these various embodiments and variations without showing any inventive step. As an example, the embodiment described in relation with FIG. 7 where the non-cylindrical lenses have a circular, rectangular, or square base may be implemented for user interface system 70 described in relation with FIG. 8, the lenses of circular, rectangular, or square bases being distant from one another, or for the user interface system 85 described in relation with FIG. 9, with supports 90 then following the contour of the lenses in order to form a support for the lenses.

The invention claimed is:

1. A user interface system comprising:
a display device comprising rows of pixels; and
a detection device for detecting an actuation member, the detection device covering the rows of pixels of the display device, the detection device comprising:
rows of photon sensors separated by dielectric transparent strips, each of the dielectric transparent strips covering at least one of the rows of pixels; and
a plurality of lenses, each of the lenses at least partially covering one of the rows of photon sensors, and each of the lenses having a central portion which only covers at least one pixel of one of the rows of pixels,
wherein each of the lenses comprises a non-planar surface comprising said central portion,
wherein, for each of the lenses, a surface area of an orthogonal projection of the central portion on a plane containing the rows of the photon sensors is greater than or equal to 50% of a surface area of an orthogonal projection of a non-planar surface on said plane, and
wherein the lenses are separated from one another by an opaque material.

2. The user interface system of claim 1, wherein each of the lenses comprises a peripheral portion surrounding the central portion, at least a portion of the peripheral portion covering at least a portion of one of the rows of photon sensors.

3. The user interface system of claim 1, wherein the rows of pixels are parallel to the rows of photon sensors.

4. The user interface system of claim 1, wherein each of the lenses covers the entire width of a single one of the rows of pixels.

5. The user interface system of claim 1, wherein each of the lenses is a cylindrical lens extending parallel to the rows of photon sensors.

6. The user interface system of claim 1, wherein the display device is a display screen, the pixels covered by the rows of photon sensors remaining black in operation.

7. The user interface system of claim 1, wherein the lenses are contiguous.

8. The user interface system of claim 1, wherein the detection device is configured for detecting variations of at least one of a shadow and an image of the actuation member and deducing therefrom information representative of a position variation of the actuation member.

9. The user interface system of claim 1, further comprising infrared emitters.

10. The user interface system of claim 1, wherein the photon sensors are organic sensors formed by deposition of organic conductive and semiconductor materials in liquid form on a dielectric support.

11. The user interface system of claim 1, wherein the display device comprises a display screen or an image attached to a support.

12. The user interface system of claim 1, wherein the actuation member is located on a side of the detection device which is opposite to the display device.

\* \* \* \* \*

UNITED STATES PATENT AND TRADEMARK OFFICE
CERTIFICATE OF CORRECTION

PATENT NO. : 10,203,811 B2
APPLICATION NO. : 14/427551
DATED : February 12, 2019
INVENTOR(S) : Antoine Gras and Jérôme Vaillant Page 1 of 1

It is certified that error appears in the above-identified patent and that said Letters Patent is hereby corrected as shown below:

On the Title Page

Item (73) Assignees should read: Commissariat a l'energie atomique et aux energies alternatives, Paris, (FR); ISORG, Grenoble (FR)

Signed and Sealed this
Twenty-first Day of April, 2020

Andrei Iancu
*Director of the United States Patent and Trademark Office*